United States Patent

Schündehütte et al.

Patent Number: 5,093,482
Date of Patent: Mar. 3, 1992

[54] REACTIVE DYESTUFFS

[75] Inventors: Karl H. Schündehütte, Leverkusen; Frank-Michael Stöhr, Odenthal, both of Fed. Rep. of Germany

[73] Assignee: Bayer Aktiengesellschaft, Leverkusen, Fed. Rep. of Germany

[21] Appl. No.: 754,182

[22] Filed: Aug. 27, 1991

Related U.S. Application Data

[63] Continuation of Ser. No. 452,905, Dec. 19, 1989, abandoned.

[30] Foreign Application Priority Data

Jan. 5, 1989 [DE] Fed. Rep. of Germany ....... 3900182

[51] Int. Cl.$^5$ .................. C09B 62/245; D06P 1/382
[52] U.S. Cl. ........................................ 534/632; 534/638
[58] Field of Search .............................. 534/632, 638

[56] References Cited

U.S. PATENT DOCUMENTS 4,007,164 2/1977 Bien et al. ................... 534/638 X

FOREIGN PATENT DOCUMENTS 0148496 7/1985 European Pat. Off. ............ 534/638
2920949 11/1980 Fed. Rep. of Germany ...... 534/632
1263003 2/1972 United Kingdom ............... 534/632

Primary Examiner—Mary C. Lee
Assistant Examiner—Fiona T. Powers
Attorney, Agent, or Firm—Sprung Horn Kramer & Woods

[57] ABSTRACT

Reactive dyestuffs of the formula

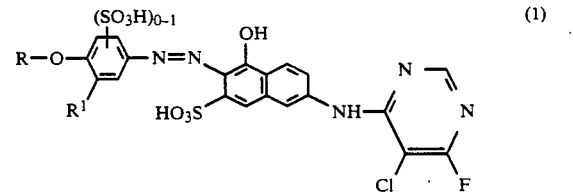

in which the
R = $C_1$-$C_5$-alkyl, cyclohexyl or aryl,
$R_1$ = H or sulpho, halogen (Cl, Br) or $C_1$-$C_4$-alkyl,
gives scarlet dyeings, which are fast to boiling, on fibre materials containing hydroxyl and amide groups.

2 Claims, No Drawings

REACTIVE DYESTUFFS

This application is a continuation, of U.S. patent application Ser. No. 452,905, filed Dec. 19, 1989, now abandoned.

The present invention relates to reactive dyestuffs of the formula

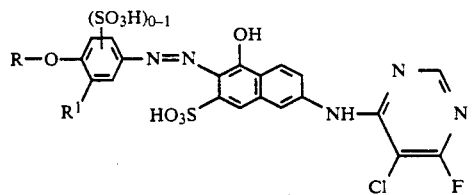

and their salts, in particular their alkali metal or ammonium salts. Preferred salts are Li salts, particularly for dyestuffs having 2 sulfonic groups.

R = optionally substituted $C_1$-$C_5$-alkyl, cyclohexyl or aryl, in particular optionally substituted phenyl, $R_1$ = H or a substituent, in particular sulfo, halogen (Cl, Br) or $C_1$-$C_4$-alkyl.

Formula (I) shows the dyestuffs containing sulphonic groups in the form of the free acids.

The preparation of the dyestuffs I is carried out, for example, according to the following processes:

1. By condensation of a reactive component of the general formula

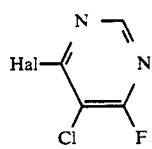

in which

Hal represents chlorine or fluorine, with an aminoazo dyestuff of the general formula

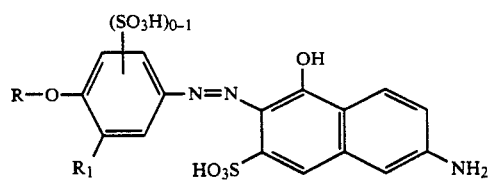

in which

R and $R_1$ have the indicated meaning,

2. By azo coupling of a condensation product of the formula

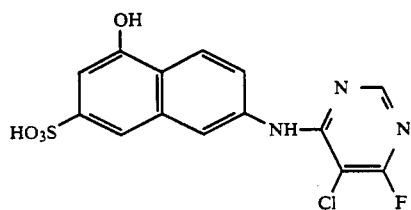

with the diazonium compounds, which are obtained in the customary manner from the amines of the general formula (V)

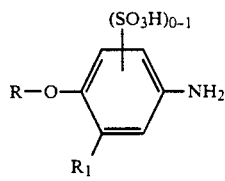

in which

R and $R_1$ have the indicated meaning.

Reactive components of the general formula (II), for example, 4,6-difluoro-5-chloropyrimidine or 4,5-dichloro-6-fluoropyrimidine are known and are obtainable, for example, from 4,5,6-trichloropyrimidine by fluoride replacement using HF or alkali metal fluorides in aprotic solvents.

The condensation with aminoazo dyestuffs of the formula (II) is preferably carried out in aqueous solution or suspension in a pH range of 4–7. The hydrogen halide liberated is neutralized by addition of aqueous alkali, particularly lithium hydroxide, lithium carbonate or lithium bicarbonate.

The aminoazo dyestuffs of the general formula (III) can be obtained by conventional routes by azo coupling of diazonium compounds of the amines of the general formula (V) with compounds of the formula (VI), the conditions being so chosen that the coupling takes place in the o-position to the OH group of the I-acid derivative.

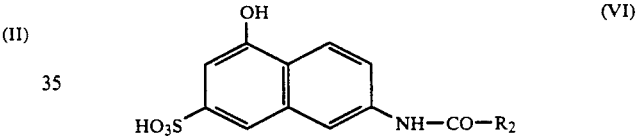

$R_2$ represents an optionally substituted aliphatic or aromatic radical.

Following the coupling, the acyl radical —$CO_2R$ is split off by warming in an acid or alkaline medium.

Suitable acyl radicals are, in particular, formyl, acetyl, maleonyl, carbamoyl or phthaloyl.

The following compounds are preferred as diazo components of the general formula (V): 1-amino-4-methoxybenzene-2-sulphonic acid, 1-amino-4-methoxybenzene-3-sulphonic acid, 1-amino-4-ethoxybenzene-2-sulphonic acid, 1-amino-4-ethoxybenzene-3-sulphonic acid, 4-aminodiphenyl-ether-2-sulphonic acid and 1-amino-4-methoxybenzene-2,5-disulphonic acid.

The novel dyestuffs are suitable for dyeing and printing materials containing hydroxyl and amide groups, such as textile fibres, threads and woven fabrics made of wool or silk and particularly for dyeing, and printing natural or regenerated cellulose, the treatment of cellulose materials being appropriately carried out in the presence of an acid-binding agent and if appropriate by the action of heat in accordance with the processes disclosed for reactive dyestuffs.

Example 1

23.9 g of 2-amino-5-hydroxynaphthalene-7-sulphonic acid are dissolved in 175 ml of water at 35° C. with about 20 ml of 20% strength sodium hydroxide solution. The pH value is then adjusted to about 5.5 by the addition of about 7 ml of 36% strength hydrochloric acid. 15.1 g of 4,6-difluoro-5-chloropyrimidine are slowly added dropwise at 35° C. to the suspension thus obtained. After transient solution the light grey acylation product of the formula

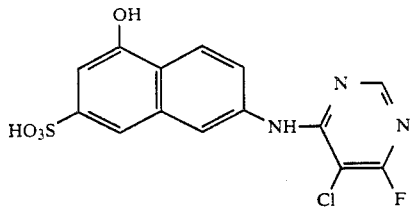

slowly precipitates out. During the condensation the pH value is held at 5.1 to 5.3 with dilute sodium carbonate solution or by the addition of dilute LiOH or sodium hydroxide solution.

The suspension of the diazonium compound of 20.3 g of 1-amino-4-methoxybenzene-2-sulphonic acid in about 200 ml of dilute hydrochloric acid, which is obtained in the customary manner, is stirred into the suspension thus obtained, with ice cooling. A pH value of about 6.5 is maintained by addition of sodium carbonate or, preferably, lithium carbonate. After several hours further stirring the precipitated dyestuff is filtered off with suction and dried under vacuum at about 50° C. The dyestuff is then in the form of a red-brown powder and dyes cotton in scarlet coloured shades. It has the following structure:

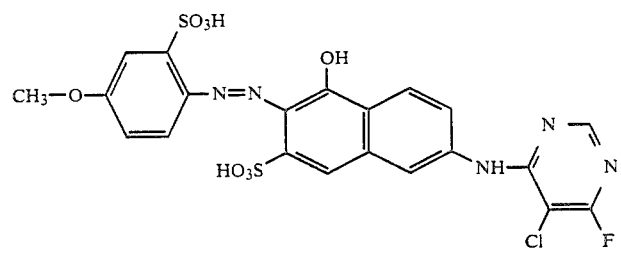

Example 2

53.3 g of the aminoazo dyestuff of the formula

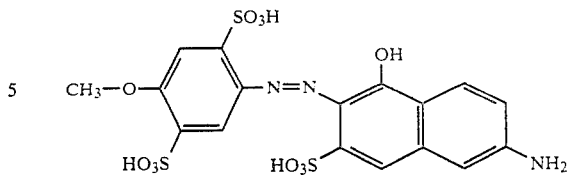

are dissolved at 70° C. in 350 ml of water containing about 20 ml of 20% strength sodium hydroxide solution. 16.6 g (0.11 mol) of 4,6-difluoro-5-chloropyrimidine are added at 70° to the solution thus obtained, the pH value being held between 5.3 and 5.5 using sodium carbonate solution and the temperature being kept at 70° C.

The condensation is complete after about 3-4 hours. 250 ml of water are then added and the dyestuff is precipitated out at 50° C. using 140 g of sodium chloride. The precipitated dyestuff is then filtered off with suction and dried under vacuum at about 50° C. The product is then in the form of an orange-coloured powder, dissolves in water to give a yellowish red colour and dyes cotton in scarlet-coloured shades.

It has the following structure:

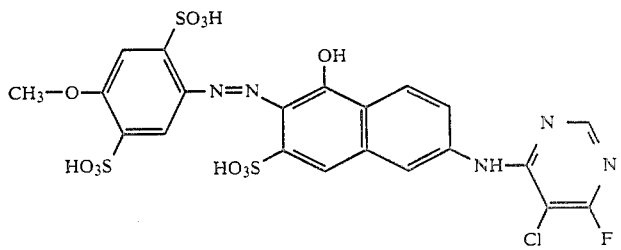

We claim:
1. A reactive dyestuff of the formula

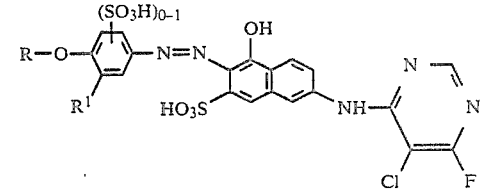
(I)

or a salt thereof, in which
R=$C_1$-$C_5$-alkyl or phenyl,
$R_1$=H or sulpho, Cl, Br or $C_1$-$C_4$-alkyl.

2. A reactive dyestuff according to claim 1 where R=$CH_3$ and $R_1$=$SO_3H$ or H.

* * * * *

UNITED STATES PATENT AND TRADEMARK OFFICE
CERTIFICATE OF CORRECTION

PATENT NO. : 5,093,482

DATED : March 3, 1992

INVENTOR(S) : Schundehutte et al.

It is certified that error appears in the above-identified patent and that said Letters Patent is hereby corrected as shown below:

Title Page & Col. 1   TITLE [54]: Before " REACTIVE DYESTUFFS " insert -- 2-[5-CHLORO-6-FLUOROPYRIMIDIN-4-YLAMINO]-5-HYDROXYNAPHTHALENE-7-SULPHONIC ACID --

Col. 2, line 41   Delete " $-CO_2R$ " and substitute -- $-COR_2$ --

Signed and Sealed this

Fifth Day of October, 1993

Attest:

BRUCE LEHMAN

Attesting Officer    Commissioner of Patents and Trademarks